(12) United States Patent
Garduno

(10) Patent No.: US 10,093,130 B1
(45) Date of Patent: Oct. 9, 2018

(54) TIRE DOLLY

(71) Applicant: Jose Garduno, Nashville, TN (US)

(72) Inventor: Jose Garduno, Nashville, TN (US)

( * ) Notice: Subject to any disclaimer, the term of this patent is extended or adjusted under 35 U.S.C. 154(b) by 147 days.

(21) Appl. No.: 15/296,160

(22) Filed: Oct. 18, 2016

(51) Int. Cl.
*B60B 29/00* (2006.01)
*B25B 13/00* (2006.01)

(52) U.S. Cl.
CPC .......... *B60B 29/001* (2013.01); *B25B 13/005* (2013.01); *B60B 29/003* (2013.01); *B60B 2900/531* (2013.01); *B60B 2900/541* (2013.01)

(58) Field of Classification Search
CPC ............... B60B 29/001; B60B 29/003; B60B 2900/531; B60B 2900/541; B25B 13/005
USPC ........................................................ 81/124.7
See application file for complete search history.

(56) References Cited

U.S. PATENT DOCUMENTS

| | | | | |
|---|---|---|---|---|
| 2,345,458 A | * | 3/1944 | Caron | B60B 29/002 157/1 |
| 2,565,869 A | | 8/1951 | Marschke | |
| 5,020,398 A | * | 6/1991 | Leu | B25B 13/005 81/124.4 |
| 5,248,235 A | * | 9/1993 | Poten | B66F 7/246 280/43.11 |
| D350,888 S | * | 9/1994 | Perry | D34/31 |
| 6,662,692 B2 | * | 12/2003 | Anderson | B60B 29/003 7/100 |
| 6,773,222 B1 | | 10/2004 | Gilchrist | |
| 6,863,488 B2 | | 3/2005 | Chopra | |
| D532,575 S | | 11/2006 | Oberg | |
| 7,597,524 B2 | | 10/2009 | Hernandez | |
| 8,061,952 B1 | | 11/2011 | Scherden | |
| 9,440,491 B1 | * | 9/2016 | Belliveau | B60B 30/10 |
| 2011/0203091 A1 | | 8/2011 | Silverstri | |

FOREIGN PATENT DOCUMENTS

| | | | | |
|---|---|---|---|---|
| JP | 2006021583 A | * | 1/2006 | B60B 29/001 |
| WO | 2008133761 A | | 1/2008 | |

* cited by examiner

*Primary Examiner* — Hadi Shakeri

(57) ABSTRACT

The tire dolly is a kit of components that are used to aid in replacing a tire with respect to a vehicle. The tire dolly includes a wrench, an adjustable stand, an extension member, and a tire skate. The wrench and adjustable stand work together to aid in loosening lug nuts of a first tire. An extension member is included with the tire dolly, and is attached onto a distal end of the wrench in order to generate more leverage with the wrench, and aid in loosening tight lug nuts. Once the lug nuts are loosened, the tire skate is secured to the tire via a strap, and the first tire is unbolted from the vehicle. The tire skate features a plurality of wheels that mobilize the tire skate and the first tire.

1 Claim, 6 Drawing Sheets

TIRE DOLLY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of automobile mechanic tools and accessories, more specifically, a tire dolly that is configured to aid in replacing a tire with respect to a vehicle.

A flat tire on a vehicle can be a real challenge to replace. This is especially true when stuck on the side of a major highway where other motorists race by at unsafe speeds. A stranded motorist may not be able to carry away the flat tire much less lift a spare tire into place. The lug nuts may be too tight for a stranded motorist to loosen. Typically, a vehicle supplies the tools needed to replace a flat tire, but the stranded motorist will still be required to lift heavy loads and unbolt tight lug nuts.

What is needed is a tire dolly that is a kit of componentry that simplifies this process such that any stranded motorist is able to complete the tasks of removing a flat tire and bolting a spare tire. The device of the present application seeks to address this need.

SUMMARY OF INVENTION

The tire dolly is a kit of components that are used to aid in replacing a tire with respect to a vehicle. The tire dolly includes a wrench, an adjustable stand, an extension member, and a tire skate. The wrench and adjustable stand work together to aid in loosening lug nuts of a first tire. The adjustable stand is positioned a distance away from the first tire, and is used to provide a lateral support of the wrench in connection with the lug nuts. An extension member is included with the tire dolly, and is attached onto a distal end of the wrench in order to generate more leverage with the wrench, and aid in loosening tight lug nuts. Once the lug nuts are loosened, the tire skate is secured to the tire via a strap, and the first tire is unbolted from the vehicle. The tire skate features a plurality of wheels that mobilize the tire skate and the first tire. Likewise, a second tire can be subsequently secured to the tire skate and maneuvered for positioning on the vehicle. The wrench, adjustable stand, and the extension member are used to tighten the lug nuts in order to securely bolt the second tire to the vehicle.

It is an object of the invention to provide a tire dolly as a kit of components that are used to enable a tire to be easily removed from a vehicle, and a subsequent tire easily installed on said vehicle.

It is a basic premise of the invention that the vehicle be properly raised via a vehicle jack in order for a respective tire to be removed and installed with the vehicle.

It is a further object of the invention for a tire skate to mobilize a tire to be removed from or installed onto the vehicle without the need for the end user to lift or otherwise manipulate a heavy tire in concert with a vehicle.

It is a further object of the invention to provide a wrench that is a four-way shaped member that works in concert with an extension member and an adjustable stand to provide leverage and ease of use in loosening a tight lug nut with respect to a tire.

These together with additional objects, features and advantages of the tire dolly will be readily apparent to those of ordinary skill in the art upon reading the following detailed description of the presently preferred, but nonetheless illustrative, embodiments when taken in conjunction with the accompanying drawings.

In this respect, before explaining the current embodiments of the tire dolly in detail, it is to be understood that the tire dolly is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the tire dolly.

It is therefore important that the claims be regarded as including such equivalent construction insofar as they do not depart from the spirit and scope of the tire dolly. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
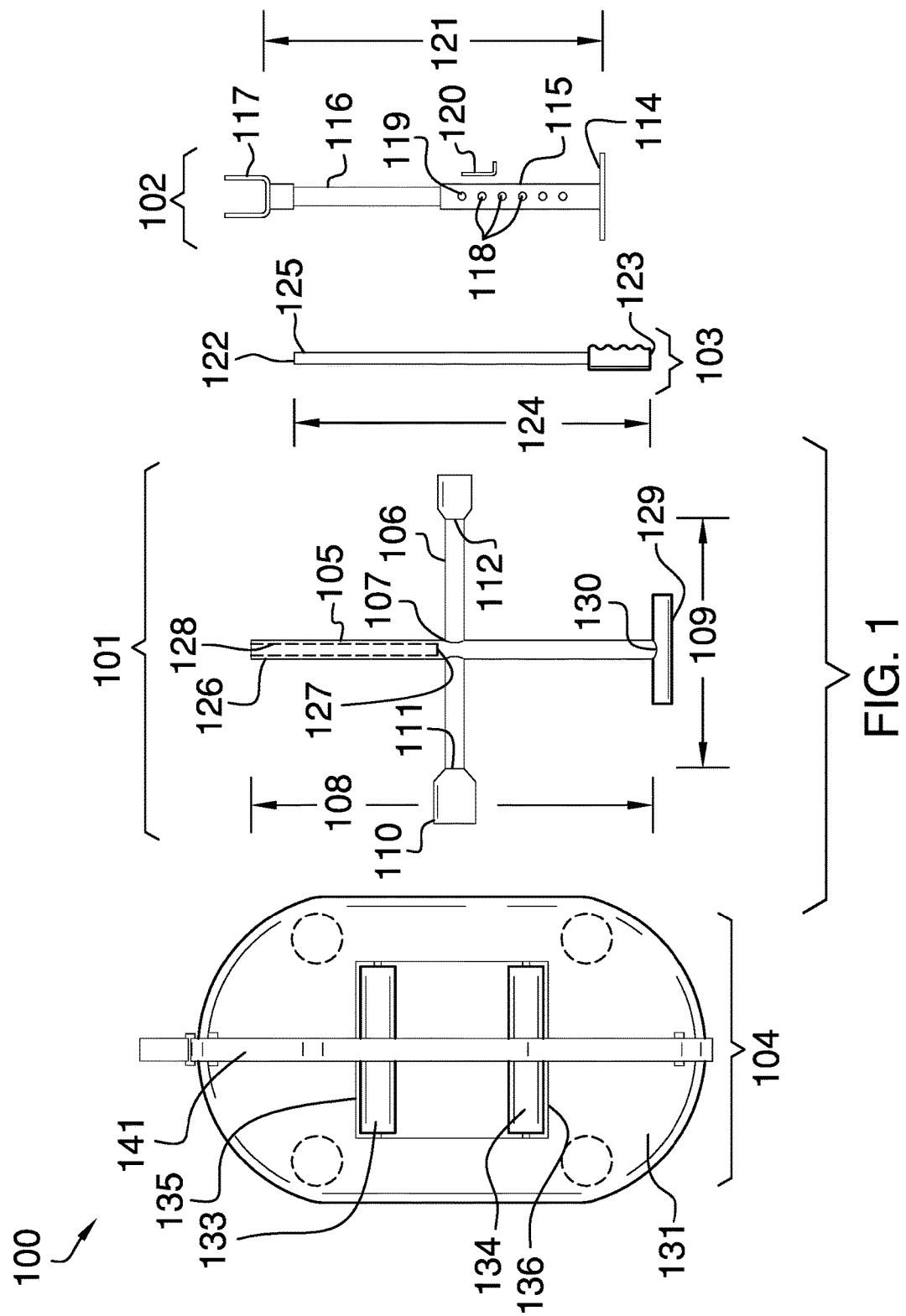
FIG. 1 is a view of all componentry associated with an embodiment of the disclosure.
Figure 2:
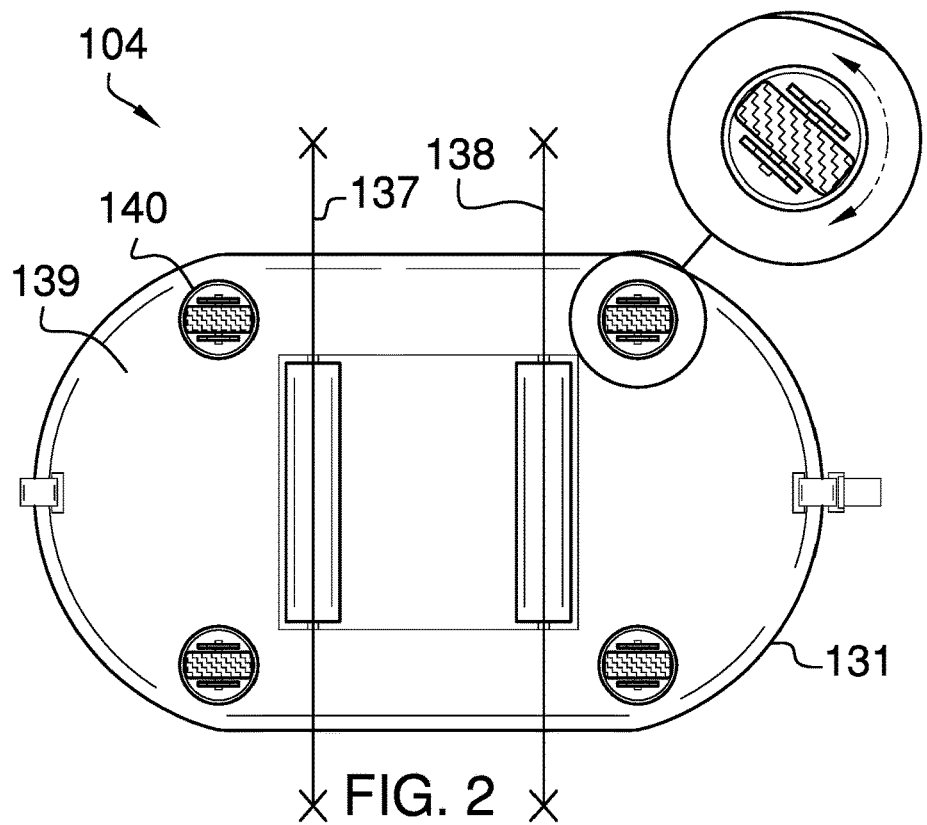
FIG. 2 is a bottom view of a specific component of an embodiment of the disclosure.
Figure 3:
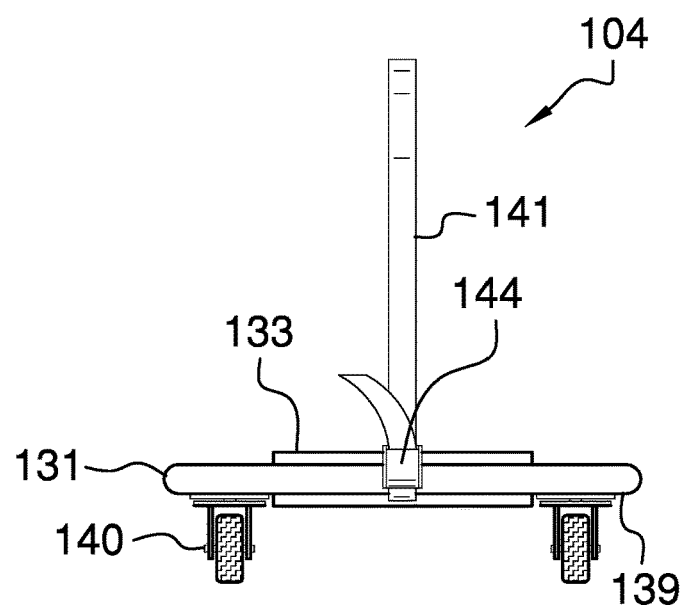
FIG. 3 is a side view of a specific component of an embodiment of the disclosure.
Figure 4:
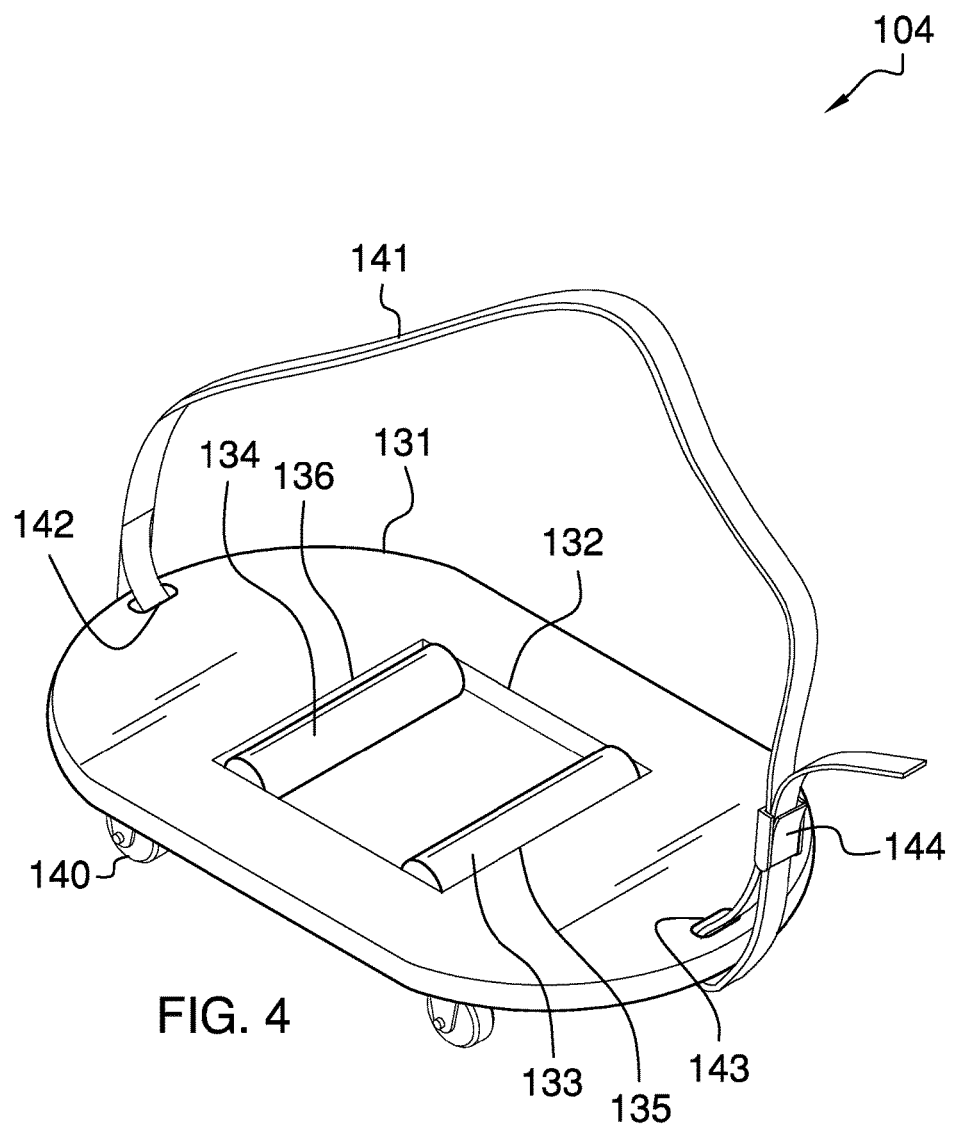
FIG. 4 is a perspective view of a specific component of an embodiment of the disclosure.
Figure 5:
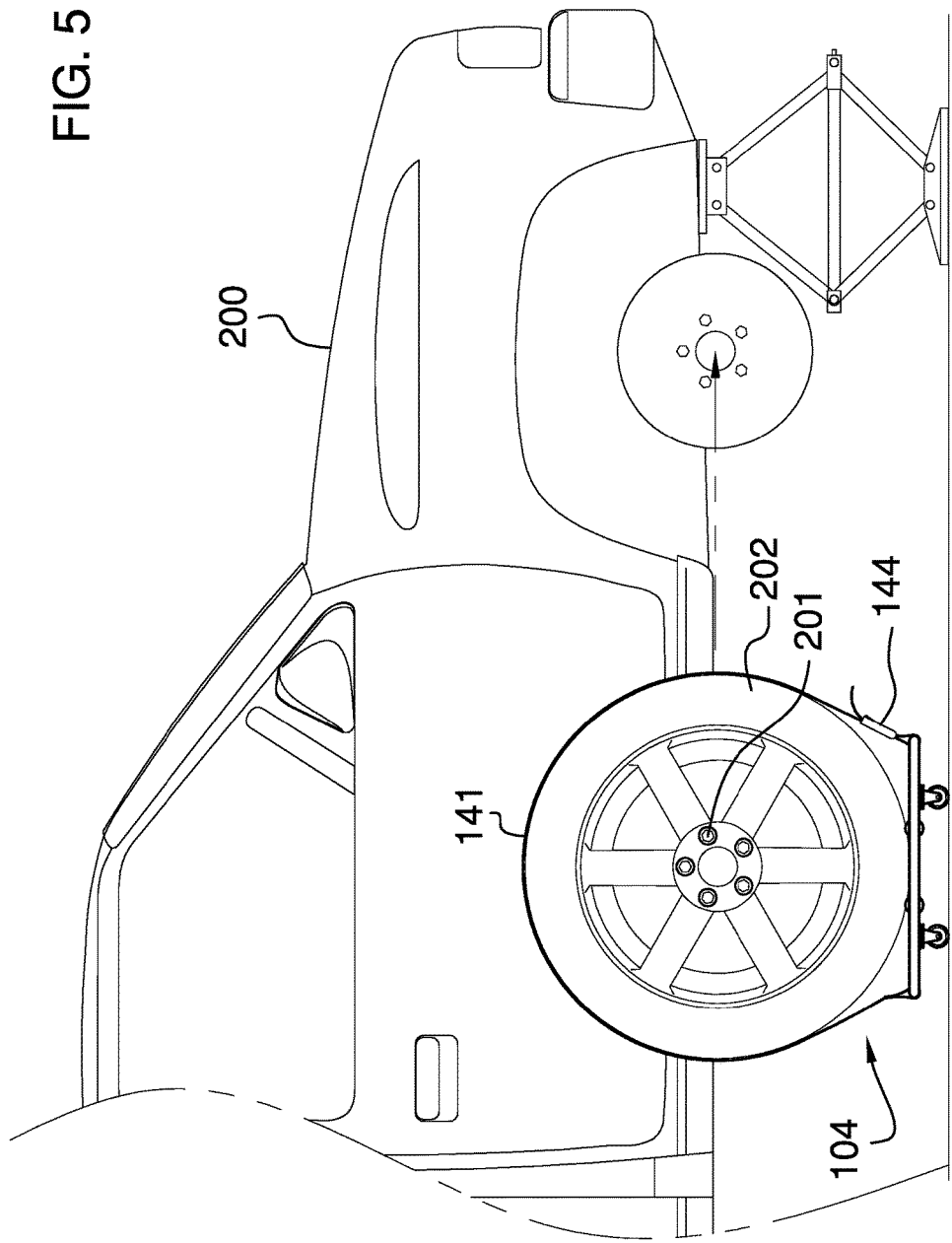
FIG. 5 is a view of an embodiment of the disclosure in use.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The tire dolly 100 (hereinafter invention) is a kit of componentry that includes a wrench 101, an adjustable stand 102, an extension member 103, and a tire skate 104.

The wrench 101 is further defined with a first armature 105 and a second armature 106. The first armature 105 intersects with the second armature 106 at an intersection 107. Moreover, the first armature 105 intersects with the second armature 106 at a midpoint along a first length 108. The same can be said for the second armature 106, which intersects at a midpoint along a second length 109. The wrench 101 is generally constructed of a metal, and is generally made of rods of steel.

The wrench 101 is configured to loosen or tighten a lug nut 201 of a tire 202. Moreover, a socket 110 is affixed to a first distal end 111 of the second armature 106. The second armature 106 is configured to interface with the lug nut 201 at the socket 110, and also rest upon the adjustable stand 102 at a second distal end 112 of the second armature 106. The second distal end 112 is opposite of the first distal end 111. The second armature 106 is able to rotate about a primary axis 113 in order to either tighten or loosen the lug nut 201.

The adjustable stand 102 is configured to lie on a ground surface and be positioned adjacent to the end user 300 and the tire 202 that is either being installed or removed from a vehicle 200. The adjustable stand 102 is further defined with a base 114 from which a first vertical member 115 extends. A second vertical member 116 is in telescopic arrangement with the first vertical member 115. The second vertical member 116 includes a "U"-shaped bracket 117 thereon. The "U"-shaped bracket 117 supports the second distal end 112 of the second armature 106 in a horizontal arrangement in order to utilize the socket 110.

The first vertical member 115 includes a plurality of holes 118. The second vertical member 116 includes a second hole 119 that when aligned with one of the plurality of holes 118 of the first vertical member 115 shall enable a key 120 to secure the second vertical member 116 at a particular position with respect to the first vertical member 115. Moreover, the key enables the "U"-shaped bracket 117 to be set at a designated elevation 121. The construction of the adjustable stand 102 may be of a metal. Moreover, the first vertical member 115 and the second vertical member 116 may be made of tubular or square stock construction.

The invention 100 includes the extension member 103. The extension member 103 is able to attach onto the wrench 101 in order to produce greater leverage. The extension member 103 is made of a metal, and is ideally of tubular construction. The extension member 103 is further defined with a first extension end 122 and a second extension end 123. An extension length 124 spans from the first extension end 122 to the second extension end 123. The first extension end 122 includes a member 125 that is able to be inserted into a receiver 126 provided on the first armature 105. Moreover, the receiver 126 is located at a third distal end 127 of the first armature 105. The receiver 126 includes a slot 128 that enables the member 125 to be inserted and thereby affix the extension member 103 to the first armature 105.

Figure 6:
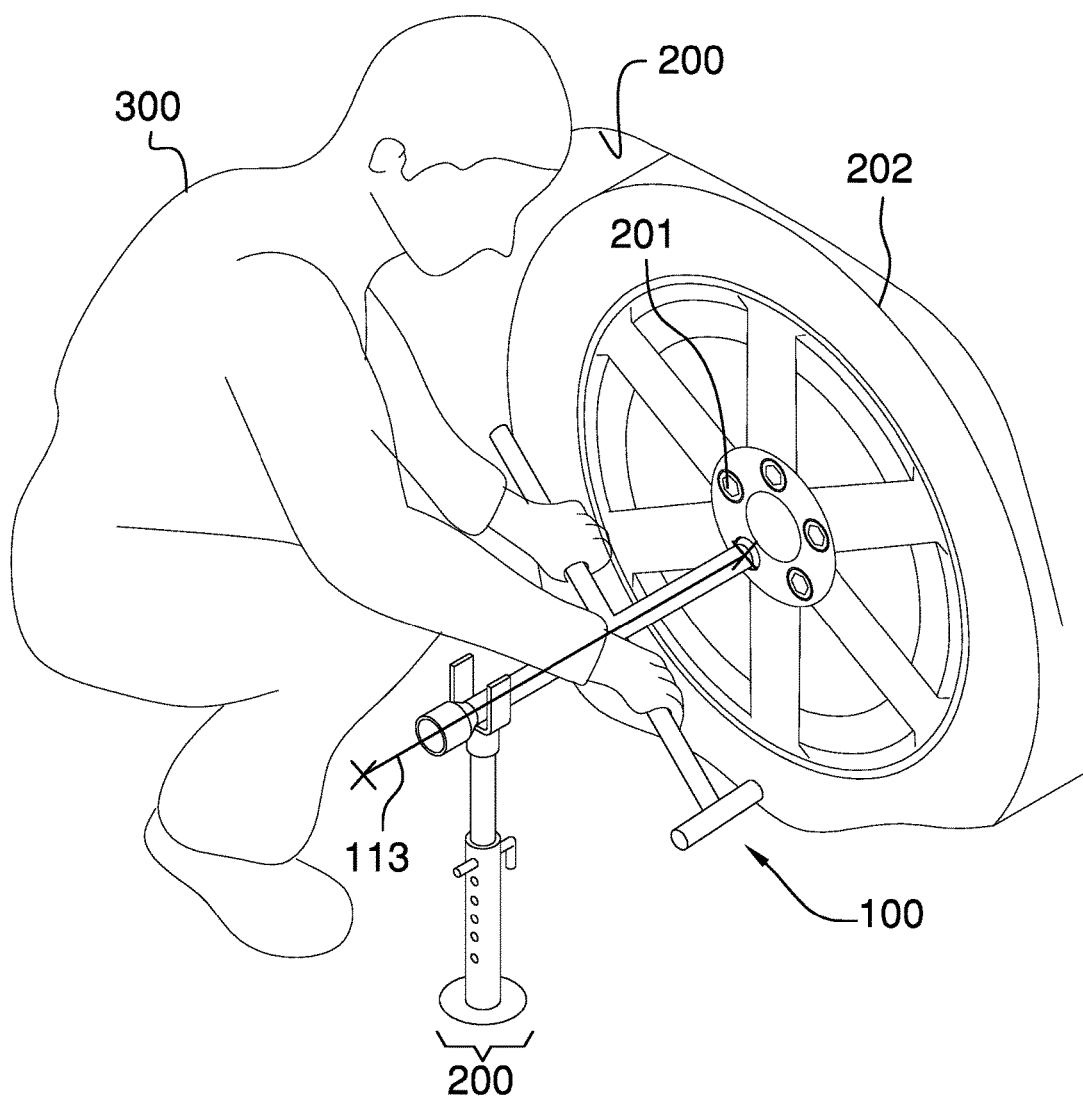
FIG. 6 is a view of a specific component of an embodiment of the disclosure in use.
Figure 7:
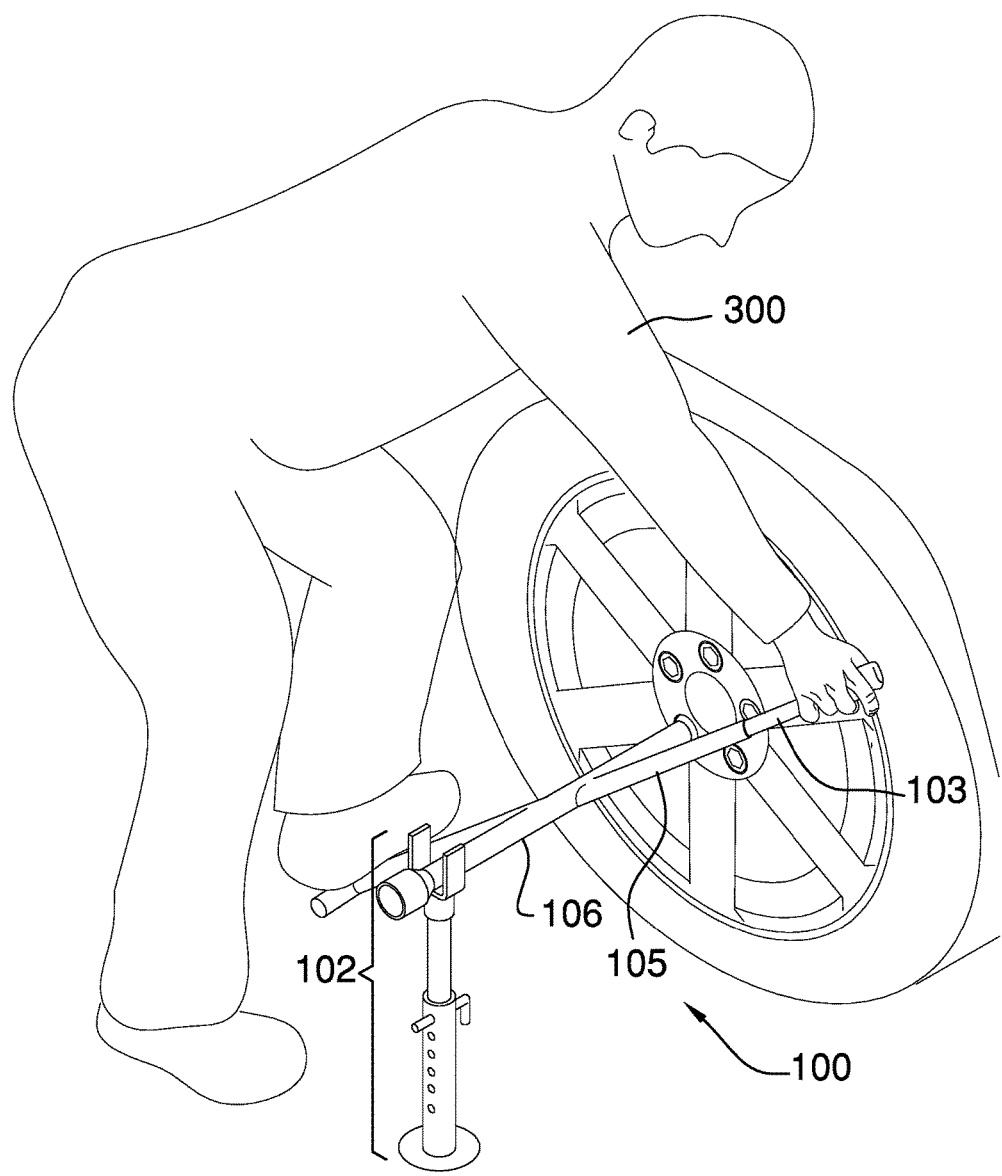
FIG. 7 is a view of a specific component of an embodiment of the disclosure in use.

The first armature 105 is further defined with a handle 129 that is located at a fourth distal end 130 of the first armature 105. The fourth distal end 130 is opposite of the third distal end 128. Referring to FIG. 7, the extension member 103 is optionally used to provide greater leverage. FIG. 6 depicts the end user 300 loosening the lug nut 201 without the extension member 103.

The tire skate 104 is configured to support the tire 202 during removal or installation. The tire skate 104 is further defined with a board 131 that is planar, and has an overall shape of an elongated circle. The board 131 features a central opening 132. A first roller 133 and a second roller 134 are positioned within the central opening 132. Moreover, the first roller 133 is adjacent to a first edge 135 of the central opening 132. The second roller 134 is adjacent to a second edge 136 of the central opening 132. The first edge 135 is opposite of the second edge 136. The central opening 132, the first roller 133 and the second roller 134 are configured to support the tire 202 upon the board 131. Both the first roller 133 and the second roller 134 are each able to rotate along a first roller axis 137 and a second roller axis 138, respectively.

The board 131 is further defined with a bottom board surface 139. A plurality of wheels 140 is affixed to the bottom board surface 139 of the board 131. The plurality of wheels 140 mobilize the tire skate 104. The plurality of wheels 140 are ideally caster wheels. The tire skate 104 includes a tire strap 141 that is configured to wrap around the tire 202 in order to secure the tire 202 atop of the board 131. The board 131 is further defined with a first strap hole 142 and a second strap hole 143. The tire strap 141 is affixed to both the first strap hole 142 and the second strap hole 143. The tire strap 141 features a spring-loaded strap clip 144 that is used to adjust the tire strap 143 relative the tire 202. The tire strap 141 secures the tire 202 atop of the board 131 in order for the tire skate 104 to be pushed around the vehicle 200 as needed, and for manipulating the tire 202 to the vehicle 200.

With respect to the above description, it is to be realized that the optimum dimensional relationship for the various components of the invention described above and in FIGS. 1 through 7 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:
1. An automotive tool comprising:
a wrench, an adjustable stand, an extension member, and a tire skate;
wherein the wrench, the adjustable stand, and the extension member are collectively configured for use in tightening or loosening a lug nut of a tire of a vehicle;
wherein the tire skate is configured to support said tire;

wherein the tire skate is mobile so as to move said tire relative the vehicle;

wherein the wrench is further defined with a first armature and a second armature;

wherein the first armature intersects with the second armature at an intersection;

wherein the first armature intersects with the second armature at a midpoint along a first length of said first armature;

wherein the second armature intersects with the first armature at a midpoint along a second length of said second armature;

wherein a socket is affixed to a first distal end of the second armature;

wherein the socket is configured to interface with said lug nut in order to tighten or loosen said lug nut;

wherein the second armature is configured to interface with the lug nut at the socket;

wherein the second armature also rests upon the adjustable stand at a second distal end of the second armature;

wherein the second distal end is opposite of the first distal end;

wherein the second armature is able to rotate about a primary axis in order to be configured to either tighten or loosen the lug nut;

wherein the adjustable stand is configured to lie on a ground surface and be positioned adjacent to the end user and the tire that is either being installed or removed from a vehicle;

wherein the adjustable stand is further defined with a base from which a first vertical member extends;

wherein a second vertical member is in telescopic arrangement with the first vertical member;

wherein the second vertical member includes a "U"-shaped bracket thereon;

wherein the "U"-shaped bracket supports the second distal end of the second armature in a horizontal arrangement in order to utilize the socket;

wherein the first vertical member includes a plurality of holes;

wherein the second vertical member includes a second hole that when aligned with one of the plurality of holes of the first vertical member shall enable a key to secure the second vertical member at a particular position with respect to the first vertical member;

wherein the key enables the "U"-shaped bracket to be set at a designated elevation;

wherein the extension member is able to attach onto the wrench in order to produce greater leverage;

wherein the extension member is further defined with a first extension end and a second extension end;

wherein an extension length spans from the first extension end to the second extension end;

wherein the first extension end includes a member that is able to be inserted into a receiver provided on the first armature;

wherein the receiver is located at a third distal end of the first armature;

wherein the receiver includes a slot that enables the member to be inserted and thereby affix the extension member to the first armature;

wherein the first armature is further defined with a handle that is located at a fourth distal end of the first armature;

wherein the fourth distal end is opposite of the third distal end;

wherein the tire skate is configured to support the tire during removal or installation with respect to said vehicle;

wherein the tire skate is further defined with a board that is planar, and has an overall shape of an elongated circle;

wherein the board features a central opening; wherein a first roller and a second roller are positioned within the central opening;

wherein the first roller is adjacent to a first edge of the central opening;

wherein the second roller is adjacent to a second edge of the central opening;

wherein the first edge is opposite of the second edge;

wherein the central opening, the first roller and the second roller are configured to support the tire upon the board;

wherein both the first roller and the second roller are each able to rotate along a first roller axis and a second roller axis, respectively;

wherein the board is further defined with a bottom board surface;

wherein a plurality of wheels is affixed to the bottom board surface of the board;

wherein the plurality of wheels mobilize the tire skate;

wherein the tire skate includes a tire strap that is configured to wrap around the tire in order to secure the tire atop of the board;

wherein the board is further defined with a first strap hole and a second strap hole;

wherein the tire strap is affixed to both the first strap hole and the second strap hole;

wherein the tire strap features a spring-loaded strap clip that is used to adjust the tire strap relative the tire;

wherein the tire strap secures the tire atop of the board in order for the tire skate to be pushed around the vehicle as needed, and for manipulating the tire to the vehicle.

* * * * *